May 27, 1952  K. T. KÄLLE  2,598,177
PUMP AND MOTOR PNEUMOHYDRAULIC TRANSMISSION SYSTEM
Filed Dec. 10, 1946  2 SHEETS—SHEET 1
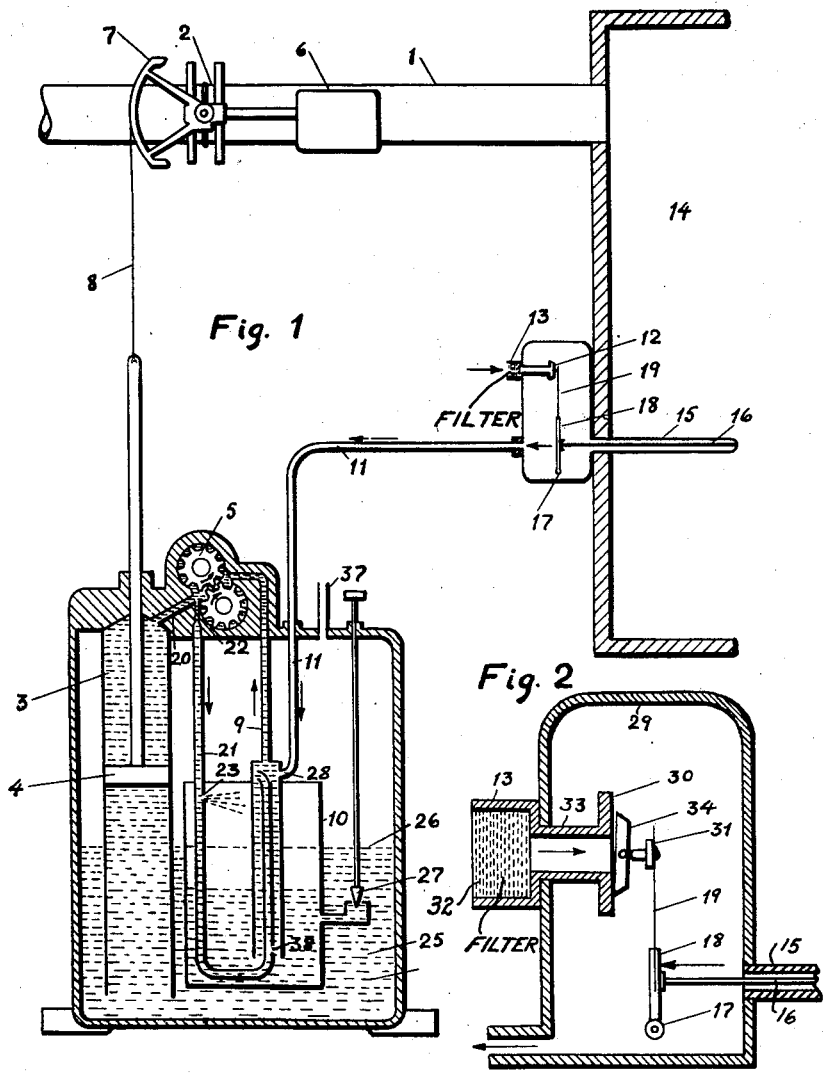

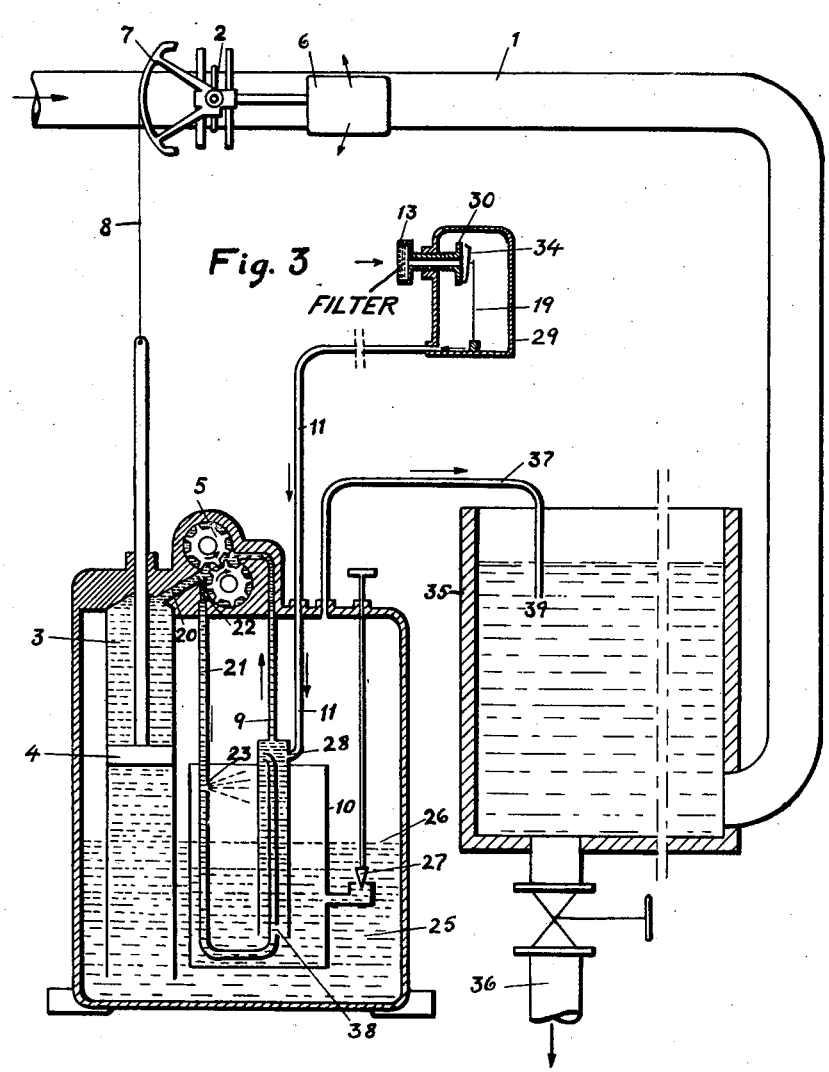

Patented May 27, 1952

2,598,177

UNITED STATES PATENT OFFICE 2,598,177

PUMP AND MOTOR PNEUMOHYDRAULIC
TRANSMISSION SYSTEM

Karl Torsten Källe, Säffle, Sweden

Application December 10, 1946, Serial No. 715,240
In Sweden May 8, 1945

8 Claims. (Cl. 60—52)

The present invention refers to improvements in regulating means, and it is an object of the invention to provide an exact and reliable adjustment and control of the subject which is to be regulated.

The regulating means according to the invention involves a sensitive control and regulation at small impulse forces without great swinging movements on both sides of the desired value of adjustment. Besides a quick return to the value of adjustment is made possible, if by any reason great variations have occurred in the conditions of the subject to be regulated. Furthermore the invention also enables a distant control of the value of adjustment, which is to be regulated, and thus it is possible by means of the invention, for instance, to bring about the desired control of a subject by means of the actual condition of another subject.

The invention accordingly consists in regulating means, comprising in combination a suction and pressure pump, the pressure conduit of which communicates with a servomotor, while its suction conduit is submerged into the liquid in a vessel which, preferably by means of an adjustable opening, communicates with a larger surrounding container also containing liquid, a gas supply conduit opening into the suction conduit, a branch provided with a restricted inlet and leading from said pressure conduit to the vessel, a gas exhaust conduit from the container, one of said gas conduits being connected to the subject to be regulated, the amount of the gas to be introduced into the suction conduit of the pump being dependent not only on the subject to be regulated but also on the pressure in said suction conduit, so that the gas amount introduced determines the liquid amount which, with constant speed of the pump, passes through the latter and after the gas having been removed on the pressure side of the pump is supplied to the servomotor and exerts a certain pressure on the movable part of the motor which pressure is decisive for the position of said parts and of the regulating member controlled by this part.

Further objects of the invention are more fully described hereinafter with reference to the accompanying drawings, which, by way of example, illustrate suitable embodiments of the regulating means according to the invention in combination with two different subjects, which are to be regulated.

Fig. 1 shows diagrammatically the regulating apparatus when used for controlling the temperature in a room, a suitable choking element giving the impulse to the apparatus, so that its servomotor actuates a valve in the heat supply conduit to the room.

Fig. 2 is an enlarged view of this choking element.

Fig. 3 shows diagrammatically the regulating apparatus, when used for controlling the liquid level in a container, the apparatus then also being utilized for distant adjustment of the value of adjustment of the subject, which is to be controlled.

In accordance with the following description oil is used as operating liquid and air as gaseous medium, though it is obvious that also other liquids and gases may be used with the same advantage.

In Fig. 1 the heat supply conduit is designated by 1 and 2 signifies a valve inserted into same, for instance a simple throttle valve. This choking element 2 is controlled by the sermomotor, which as shown in the drawings consists of a cylinder 3 with a movable piston 4 therein. The piston 4 is actuated in one direction (downwards) by the oil pressure from the gear pump 5 and in the other direction (upwards) by a counterweight or spring 6 by means of a lever or wheel section 7 and a connecting wire 8. The suction side of the pump 5 is connected with the open top oil receptacle 10, hereinafter referred to as return vessel, by means of a conduit 9, the end of which is submerged into the oil in this vessel. In the lower and strongly enlarged portion of the suction conduit 9, the air conduit 11 ends at 23 and communicates with the surrounding atmosphere through the air inlet 13 by means of a special throttle 12, which will be more fully described hereinafter. This throttle is actuated by the subject to be regulated, in this case by the temperature in room 14, in such a way that the protection tube 15 variable in length at changes in the temperature and the rod 16 secured at the bottom in this tube, which rod is invariable in length and for instance is made of "Invar," together with the pivot point 17 and the lever 18 involve variations in tension of the spring 19 and changes in position of the throttle 12, respectively, so that the air flow in the tube 11 changes at varying temperatures in the room 14.

The pressure side of the pump 5 is provided with an inclining channel 20, leading to the upper part of the cylinder 3 above the piston, and a branch 21 provided with a restricted inlet 22 leads from this channel 20 for returning oil or air or both in mixture to the vessel 10. As will be seen by Fig. 1 the pump 5 together with the pressure relax channel 22 is suitably placed above the cylinder 3, thereby enabling a continuous removing of air in the latter and furthermore a more incompressible pressure medium is obtained which results in a more exact movement of the piston. The conduit 21 extends first nearly down to the bottom of the vessel 10 and then upwards, forming a U-shaped sling, and then ends in the suction conduit 9, preferably substantially at the same level as its gas inlet 28. The conduit 21 has an exhaust opening 23 on its downward sling above the normal liquid level, and another opening 38 in the conduit 21 is provided under this liquid level, preferably on the upward sling. It is obvious that several such openings may be provided, if desired. By the opening 23 the main part of the air mixed with gas is shot off together with sprays of oil, the purer oil then flowing on through the conduit. With this arrangement I intend to bring the formation of foam in the return vessel 10 down to a minimum, as oil otherwise would get lost by overflowing the edge of the vessel. By this detail practically all foaming is prevented, as the main part of the oil and the fine air bubbles always circulate in the pump.

The purpose of the opening 38 is as follows. If the regulator is stopped, i. e. if the regulating piston is in its highest position and the pump rests, the level sinks in the enlarged suction conduit 9 to the same level as in the vessel 10 and the oil container 25. When the regulator then starts again the conduit 21 will be emptied and this empty conduit opens the communication between the suction side of the pump and the opening 23, which is arranged above the liquid level of the container 25. Hence the pump will suck air this way (through 23) and can never start with oil. By boring a small hole 38 beneath the liquid level of the vessel 10, there is formed a liquid seal in the bottom of the U-shaped tube, whereby such an air communication then is shut off.

The return vessel 10 is half submerged into the surrounding container 25, in which the oil level 26 is substantially constant. The return vessel is also provided with a throttle 27 adjustable outside the container, by means of which throttle the return vessel communicates with the surrounding oil container.

As will be seen in the drawings the oil container is provided with an exhaust conduit 37 for gas, which in this case may escape freely, the container thus being in connection with the surrounding atmosphere.

The throttle 12 of Fig. 1 as shown in part in greater detail in Fig. 2 is wholly enclosed in the tight housing 29 and consists in a smooth-ground support 30 and an easily movable disc valve 34. which is hinged to a bracket 31. The lever 18 is easily turnable around pivot point 17 and is provided with a resilient extension 19, which at its free end supports the bracket 31 with the disc valve 34. The support 30 is stationary and provided with a channel, so that it can communicate with the surrounding atmosphere by means of a filter 32. Through the pipe 33 the air flows into the regulator.

The construction of the suction pipe 9 (Fig. 1) should be such as to make the pressure in the gas supply conduit and in the impulse valve 12 (Fig. 1) totally dependent on the level in the return vessel 10. In order to meet this requirement the suction pipe portion below the air inlet 28 must have a cross section sufficiently large that the flow of the liquid through that portion has no influence upon the gas pressure in the line 11, or in other words, the cross section must be sufficiently large so that no noticeable resistance to the flow through it is offered at the actual speeds of flow. Due to this, the liquid pressure at the air intake 28 will be dependent only on the air pressure in container 25 and the liquid level in vessel 10, and the pressure in line 11 will in turn be dependent on the liquid pressure at the air intake 28. The suction pipe above the air inlet 28 should however have a small cross section in order to have as small a volume of medium as possible between the air inlet 28 and the channel 20. Variations in the negative pressure in the impulse conduit 11, occurring in consequence of a changed level in the return vessel 10, act directly upon the impulse element, i. e. the valve 12. As this valve 12 has a relatively large area also small variations in the negative pressure cause a noticeable change in the impulse force, and thus, the impulse force is caused to differ more or less from the datum value to the extent in which the level in the return vessel is higher or lower.

The device as hereinbefore described is operated in the following manner. Assuming that the regulator is in its equilibrium, i. e. the piston 4 and the regulating valve 2 are at an absolute stop in a certain central position and the temperature in room 14 hence is the one, which is desired, for instance 50° C., which temperature thus corresponds to the momentary value of adjustment of the impulse element. Under these circumstances the level is the same in the return vessel 10 and in the oil container 25, as these vessels are communicating with each other. The pressure at the air inlet 28 on the suction conduit 9 then has a certain value resulting in a certain force being exerted on the impulse valve 12 and on the contacting spring 19, in order to let a certain amount of air flow into the suction conduit and hence into the pump, which amount may correspond to say half the capacity of the pump. The other half capacity then corresponds to the amount of oil coming from the return vessel 10. This oil-airmixture offers a certain resistance in the restricted channel 22, this resistance exerting a certain pressure in the cylinder 3, which pressure when acting upon the piston 4 is counterbalanced by the counterweight 6 of the regulating valve 2. As the capacity of the pump is constant, the pressure on its pressure side is dependent only on the proportion between air and oil.

Assuming that the temperature in the room 14 now instead is increased to, say 51° C. the impulse tube 15 is elongated this causing a slight movement of the lever 18 which in turn releases the spring 19. The equilibrium between the force on the throttle valve and the tension in the spring 19 therefore is displaced in such a way that the throttle valve 12 is opened a bit more. This causes air to flow via the air conduit 11 into the pump, then a corresponding smaller amount of oil also flowing into the latter. The oil pressure then decreases in the cylinder 3, the counter-weight gets predominant and the piston 4 moves upwards, the regulating valve 2 then beginning to choke the heat supply. When the piston moves upwards, a certain amount of oil must be pushed out from the cylinder 3 via the branch 21 to the return vessel 10. The level of the oil in this vessel will then rise until it gets higher than in the oil container 25. This, however, causes the negative pressure in the suction pipe 11 to diminish a little, the pressure in the throttle valve 12 then being somewhat released. This valve then goes back, perhaps into its original equilibrium and chokes the air flow to a corresponding extent, while the piston 4 stays in its new position. As the oil level in the return vessel 10, however, now gets higher than in the surrounding container 25, the oil immediately begins to flow out through the choking valve 27 with a speed corresponding to its choking position. This causes the suction in the air conduit 11 to increase as a function of the level depression. The force acting on the throttle valve 12 is then somewhat increased causing more air to flow in, which results in an upward movement of the piston. This movement will occur in the same pace of time as the level in the return vessel 10 goes back to the corresponding level in the container 25. Meanwhile the temperature in the room 14 has owing to the choking effect of the regulating valve 2 gone down again to 50°, and the new equilibrium has been reached.

On the other hand, if a very quick increase of the temperature, say 5°, occurs in the room 14, the movement of the lever 18 will obviously be greater than when the change as hereinbefore described only is 1° and then the release of the spring 19 will also be a greater one. The throttle valve then allows much more air to flow in, and the piston 4 can move upwards until the level in the return vessel 10 has risen to such a value, that owing to the strongly decreased suction the force exerted on the impulse valve now is diminished to such an extent that the tension in the spring 19 can hold said valve in such a choking position that the oil pressure on the piston brings about equilibrium. From this it will be seen that the greater the change in temperature occurring around the impulse tube 15, the greater must the variation of level in the return vessel 10 and the variation of movement of the piston 4 be respectively, before the throttle valve gets into equilibrium. If the temperature in the room 14 sinks instead beneath the value of adjustment, the tension of the spring 19 will of course increase instead. The throttle valve 12 then shuts off more and the pump takes in more oil, the oil pressure then rising in the cylinder 3, the piston then moving downwards and the oil level in the return vessel 10 then sinking beneath the level of equilibrium in the container 25. Hereby the suction in the air conduit 11 is increased, this resulting in the reverse progress as has been described hereinbefore.

By the choking valve 27 the degree of return, i. e. the stiffness of the return, can be adjusted.

Fig. 3 shows an embodiment, in which the gas exhaust conduit 37 from the container 25 is in connection with the subject to be regulated, in this case the water level in receptacle 35, while the gas supply conduit is utilized for distant control of the value of adjustment. The pressure in the conduit 37 is thus dependent on the subject to be regulated and consequently the liquid height in the suction conduit 11 will be dependent on the difference of level as well as on the pressure in the exhaust conduit 37.

In the construction as shown in Fig. 3 the apparatus itself with its appertaining suction and pressure pump and servomotor is constructed in the same way as has already been described with reference to Fig. 1 and the same reference characters designate corresponding parts in the different figures. In this case the air inlet is adjusted by an operating wheel 13, which is screwed into a closed box 29, from which extends the conduit 11. The end of the air inlet extending into the box is enlarged to form a support 30, against which a choking member 34 is pressed by a spring 19. The air supply to the conduit 11 may also be controlled by screwing the operating wheel 13 in or out, the pressure of the choking member against the support then being increased or decreased. The air conduit 11 can be relatively long, this making it possible to place the adjusting device in a suitable place spaced from the regulating means. According to the principle for the regulating means above mentioned, the pressure in the conduit 37 and in the container 25 and thus also the liquid height in the return vessel 10 are dependent on the liquid level in the receptacle 35, i. e. dependent on the resistance offered by the liquid in the receptacle owing to its level above the mouth 39 of the conduit when the air escapes.

The device as described hereinbefore works in the following manner:

Assuming that the regulator is in equilibrium, i. e. the piston 4 and the regulating valve 2 being at an absolute stop in a certain central position and the liquid level in the receptacle 35 being as desired and thus corresponding to the adjustment of the control member 13, the oil level in the return vessel 10 and container 25 will be equal, as these vessels communicate with each other, and the pressure in the regulating housing formed by the container 25 has a constant value. The suction at the air inlet 28 then has a certain value, which results in a certain force exerted on the choking member 34 and in a tension of the spring 19, respectively, the suction pipe and the pump then taking in a certain amount of air, which we may assume corresponds to half the capacity of the pump. The other half capacity is then filled with oil coming from the return vessel 10. This oil-air-mixture offers a certain resistance in the restricted channel 22, this resistance exerting a certain pressure in the cylinder 3 which pressure when acting on the piston 4 is counterbalanced by the counterweight 6 of the regulating valve 2. As the capacity of the pump is constant, the pressure on its pressure side is dependent only on the proportion between air and oil. As long as the liquid level in the container 35 is not changed there will be equilibrium in the proportion between air and oil.

Assuming now instead that the liquid level in the container 35 sinks a little. When the liquid level in the container 35 sinks somewhat the resistance against the escape of air through the pipe end 39 is diminished, and consequently the pressure in the container 25 decreases. On account of this diminished pressure in the container 25 the pressure of the liquid in the enlarged portion of the suction conduit 9 will be lower, so that the pump takes a smaller proportion of liquid and a greater proportion of air and thus more air flows through the conduit 11. The oil pressure is hereby caused to decrease in the cylinder 3, the counterweight 6 then being predominant and, the piston 4 moving upwards, the regulating valve 2 then being opened for a greater supply of liquid to the receptacle 35. When the piston moves upwards, a certain amount of oil must be pushed from the cylinder 3 through the branch 21 into the return vessel 10. The level in this vessel will then rise until it gets higher than the level in the oil container 25. This, however, causes the pressure in the container 25 to rise and hence the suction in the suction conduit 11 will decrease, the pressure in the choking member 34 then being somewhat released. This member then goes back, perhaps into its original equilibrium and chokes the air flow to a corresponding extent, while the piston 4 stays in its new position. As the oil level in the return vessel 10, however, now gets higher than in the surrounding container 25, the oil immediately begins to flow out through the choking valve 27 with a speed corresponding to its choking position. This causes the pressure in the air conduit 11 to decrease as a function of the level depression. The force acting on the choking member 34 will then increase a little causing more air to flow in, which results in an upward movement of the piston. This movement will occur in the same pace as the level in the return vessel 10 goes back to the corresponding level in the container 25. Meanwhile the liquid in receptacle 35 has risen again to its original level as the regulating valve 2 has been opened, and a new equilibrium has been reached.

If instead the liquid in receptacle 35 rises above the desired level, the pressure in the container 25 will be higher and the pump take in more oil, the oil pressure in the cylinder 3 then increasing and the piston then moving downwards, causing the oil level in the return vessel to sink beneath the level of equilibrium in the container 25. Hereby the suction in the air conduit 11 is increased, which results in a reverse progress as has been described hereinbefore.

If it is desirable to set another liquid level, it is only necessary to turn the operating wheel 13, the choking member 34 then offering more or less resistance against the air flowing into the conduit 11, this in turn causing a smaller or greater amount of air to flow into the pump.

By the choking valve 27 the degree of return, i. e. the speed of return, can be adjusted.

The regulating means are, of course, not limited to the embodiments as shown and described hereinbefore but may be modified in any suitable manner without departing from the scope of the invention. Thus, the servomotor as shown may be substituted by a membrane motor, which is even to prefer in some cases. In Fig. 1 the gas exhaust conduit can for instance be connected to an adjusting member, say a choking valve, for distant adjustment of the desired temperature in the room. Likewise the temperature in the room may instead be controlled by said gas exhaust conduit, while the gas supply conduit is connected to the member for distant adjustment.

The regulating means according to the invention can be used within a wide field of application. Thus both the gas supply conduit and the gas exhaust conduit can be connected to regulating members for the control of two correlating conditions of functions. The temperature of the surrounding atmosphere may hence control the temperature of the water in a boiler feeding the central-heating in buildings, it thus being possible automatically to obtain a constant room temperature independent of variations in the temperature of the surrounding atmosphere.

I claim:

1. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, a gas supply conduit terminating in the suction conduit of the pump, a branch pipe with a restricted inlet leading from the pressure conduit of the pump to the vessel, and a member communicating with the subject to be regulated and controlling the proportions of gas and liquid supplied to the pump in accordance with variations in said subject to be regulated.

2. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, a gas supply conduit terminating in the suction conduit of the pump, a portion of said suction conduit extending beneath the gas inlet being enlarged, a branch pipe with a restricted inlet leading from the pressure conduit to the vessel, said branch pipe having an exhaust opening above the liquid surface in the container to evacuate gas from the liquid flowing through said branch, and a member communicating with the subject to be regulated and controlling the proportions of gas and liquid supplied to the pump in accordance with variations in said subject to be regulated.

3. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, a gas supply conduit terminating in the suction conduit of the pump, a branch pipe with a restricted inlet leading from the pressure conduit of the pump down into the vessel and then up again to form a U-shaped sling and ending in the suction conduit substantially at the same height as the gas inlet into the latter, said branch pipe having an exhaust opening above the liquid surface in the container to evacuate gas from the liquid flowing through said branch, and a member communicating with the subject to be regulated and controlling the proportions of gas and liquid supplied to the pump in accordance with variations in said subject to be regulated.

4. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, a gas supply conduit terminating in the suction conduit of the pump, a portion of said suction conduit extending beneath the gas inlet being enlarged, a branch pipe with a restricted inlet leading from the pressure conduit of the pump down into the vessel and then up again to form a U-shaped sling and ending in said enlarged portion of the suction conduit substantially at the same height as the gas inlet into the latter, said branch pipe having an exhaust opening above the liquid surface in the container to evacuate gas from the liquid flowing through said branch, and a member communicating with the subject to be regulated and controlling the proportions of gas and liquid supplied to the pump in accordance with variations in said subject to be regulated.

5. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, said servomotor comprising a cylinder enclosing a plunger which exerts the regulating effect, one end of said cylinder being connected to the pressure conduit of the pump while the other end is in free communication with the container, a gas supply conduit terminating in the suction conduit of the pump, and a branch pipe with a restricted inlet leading from the pressure conduit of the pump to the vessel, said branch pipe having an exhaust opening above the liquid surface in the container to evacuate gas from the liquid flowing through said branch, and a member communicating with the subject to be regulated and controlling the proportions of gas and liquid supplied to the pump in accordance with variations in said subject to be regulated.

6. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, a gas supply conduit controlled by the condition of said subject to be regulated and terminating in the suction conduit of the pump, and a branch pipe with a restricted inlet leading from the pressure conduit of the pump to the vessel, said branch pipe having an exhaust opening above the liquid surface in the container to evacuate gas from the liquid flowing through said branch, and a member communicating with the subject to be regulated and controlling the proportions of gas and liquid supplied to the pump in accordance with variations in said subject to be regulated.

7. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, the upper part of the vessel being in free communication with the upper part of the container, a gas supply conduit terminating in the suction conduit of the pump, a branch pipe with a restricted inlet leading from the pressure conduit of the pump to the vessel, and a gas exhaust conduit from the container controlled by the condition of said subject to be regulated, said branch pipe having an exhaust opening above the liquid surface in the container to evacuate gas from the liquid flowing through said branch, and a member communicating with the subject to be regulated and controlling the proportions of gas and liquid supplied to the pump in accordance with variations in said subject to be regulated.

8. Regulating apparatus comprising in combination a constant speed and positive displacement pump, a servomotor connected to the pressure conduit of the pump to exert a regulating effect on a subject to be regulated in response to variations in the amount of liquid passing through the pump, an open-topped vessel containing liquid into which the suction conduit of the pump is immersed, a larger container also containing liquid surrounding said vessel and communicating therewith through an adjustable opening, the upper part of the vessel being in free communication with the upper part of the container, a branch pipe with a restricted inlet leading from the pressure conduit to the vessel, a gas supply conduit terminating in the suction conduit of the pump, and a gas exhaust conduit from the container, said exhaust conduit being controlled by the condition of said subject to be regulated, gas supply remote control means, said supply conduit being connected to said remote control means, said branch pipe having an exhaust opening above the liquid surface in the container to evacuate gas from the liquid flowing through said branch, and a member communicating with the subject to be regulated and controlling the proportions of gas and liquid supplied to the pump in accordance with variations in said subject to be regulated.

KARL TORSTEN KÄLLE.

REFERENCES CITED

The following references are of record in the file of this patent:

UNITED STATES PATENTS

| Number | Name | Date |
|---|---|---|
| 732,908 | Thomson | July 7, 1903 |
| 2,147,977 | Källe | Feb. 21, 1939 |
| 2,247,238 | Johnston | June 24, 1941 |

OTHER REFERENCES

Ser. No. 261,139, Waltenbauer (A. P. C.), published April 27, 1943.